(12) United States Patent
Millon et al.

(10) Patent No.: US 6,331,331 B1
(45) Date of Patent: Dec. 18, 2001

(54) DECORATED POLYESTER TUBE PACKAGE FOR AQUEOUS COMPOSITIONS

(75) Inventors: Joel Millon, Westfield, NJ (US); Kenneth Berger, Gainesville, FL (US); Robert Readdy, Hopatcong; Derek Samaroo, Edison, both of NJ (US)

(73) Assignee: Colgate-Palmolive Company, New York, NY (US)

( * ) Notice: Subject to any disclaimer, the term of this patent is extended or adjusted under 35 U.S.C. 154(b) by 0 days.

(21) Appl. No.: 09/302,689

(22) Filed: Apr. 29, 1999

(51) Int. Cl.[7] .............................. H05H 1/32; B05D 3/02; B05D 1/02; B05D 1/36
(52) U.S. Cl. .................. 427/536; 427/539; 427/393.5; 427/258; 427/421; 427/412.5
(58) Field of Search ................... 427/539, 540, 427/536, 393.5, 258, 359, 421, 412.5

(56) References Cited

U.S. PATENT DOCUMENTS

| | | |
|---|---|---|
| 2,824,025 * | 2/1958 | McIntyre, Jr. .................... 427/412.5 |
| 3,210,215 * | 10/1965 | Aitken et al. .................... 427/412.5 |
| 3,309,222 * | 3/1967 | Caldwell ........................ 427/412.5 |
| 3,547,294 | 12/1970 | Williams . |
| 3,552,998 * | 1/1971 | Weyna et al. .................... 427/412.5 |
| 3,746,196 | 7/1973 | Sako et al. . |
| 3,804,663 | 4/1974 | Clark . |
| 3,853,588 * | 12/1974 | Haskell et al. ................... 427/412.5 |
| 3,900,616 * | 8/1975 | Moore ........................... 427/412.5 |
| 4,051,265 | 9/1977 | Kirshenbaum et al. . |
| 4,117,061 | 9/1978 | Jørgensø. |
| 4,166,881 * | 9/1979 | Congdon et al. ................... 428/463 |
| 4,254,170 | 3/1981 | Roullet . |
| 4,267,143 | 5/1981 | Roullet . |
| 4,370,368 | 1/1983 | Hirata et al. . |
| 4,478,889 | 10/1984 | Maruhashi et al. . |
| 4,505,951 | 3/1985 | Kennedy . |
| 4,515,836 | 5/1985 | Cobbs, Jr. et al. . |
| 4,552,791 | 11/1985 | Hahn . |
| 4,615,925 | 10/1986 | Nilsson . |
| 4,714,580 | 12/1987 | Maruhashi et al. . |
| 4,919,985 | 4/1990 | Asai et al. . |
| 4,977,032 * | 12/1990 | Grosjean ........................ 427/412.5 |
| 4,980,211 | 12/1990 | Kushida et al. . |
| 5,073,420 | 12/1991 | Yano et al. . |
| 5,085,034 | 2/1992 | Haas . |
| 5,238,718 | 8/1993 | Yano et al. . |
| 5,300,354 * | 4/1994 | Harita et al. ..................... 428/215 |
| 5,512,338 * | 4/1996 | Blanchini et al. ................. 427/412.5 |

\* cited by examiner

Primary Examiner—Marianne Padgett
(74) Attorney, Agent, or Firm—Michael J. McGreal

(57) ABSTRACT

Injection stretch blowmolded polyester tubes have been developed for use in packaging water-containing products. Polyester resins have good barrier properties for organic materials but poor moisture barrier properties. It has been found that the moisture barrier properties can be increased by coating the exterior surface of the tube with a first material which adheres to the tube polyester surface and to an overlayer of a moisture barrier comprising polyvinylidene chloride, However, since the overlayer of polyvinylidene chloride can develop a yellow tint, the overlayer in one embodiment is coated with an opaque decorative layer to prevent or mask the gradual yellowing of the polyvinylidene chloride overlayer. In another embodiment where the tube is to be substantially transparent, the product in the tube will have a color that will substantially cancel the yellow tint that is developed by the polyvinylidene chloride overlayer. In a further embodiment the tube is of a color to cancel out the yellow tint color of the polyvinylidene chloride layer. The moisture transmission of the tube wall in any of the embodiments is reduced to less than about 1 gram/m$^2$/day. In a preferred embodiment both the tube wall and the upper tube shoulder have this coating structure to decrease moisture loss from the contained product through both the tube shoulder and the sidewall.

25 Claims, 1 Drawing Sheet

DECORATED POLYESTER TUBE PACKAGE FOR AQUEOUS COMPOSITIONS

FIELD OF THE INVENTION

This invention is directed to polyester packages having flexible sidewalls that are suitable for containing aqueous compositions. More particularly, this invention is directed to biaxially oriented polyester tube containers that are decorated and which have effective barrier properties with respect to moisture.

BACKGROUND OF THE INVENTION

Flexible container packaging, such as collapsible tube packaging, presently is made from single and multilayer films. These usually are polyolefin containing films. Suitable polyolefins are polyethylene and polypropylene. When a multilayer film, the film structure, in addition to polyolefins, will contain layers of polymers such as ethylene vinyl alcohols, ethylene vinyl acetates, ethylene-propylene copolymers, metal foils, paper and other materials. In these packages the polyolefins provide a good moisture barrier. However, they have poor organic barrier properties, and for a given weight are not as strong as other materials.

It has been found that packaging tubes having a high strength can be produced from polyester resins, such as polyethylene terephthalate resins, and in particular from biaxially oriented polyethylene terephthalate. However, such tube packages do not have good moisture barrier properties. They are effective to package nonaqueous compositions. When used to package aqueous compositions, there is a transfer of moisture from the composition through the package wall and a change in the physical properties of the composition. This problem of providing a polyester tube package, such as a polyethylene terephthalate tube package, with effective moisture barrier properties is addressed in the present application for patent. As used in this application tube includes those that are crimp sealed at the end opposite the nozzle and those that are continuous throughout the tube body and which are filled through the upper shoulder/nozzle region.

It is known to coat polyester container surfaces with polyvinylidene chloride solutions or emulsions to make the containers less permeable to contained gases such as carbon dioxide. The interior surface can be coated but usually the exterior surface is coated. Also there can be a polyvinylidene chloride or other polymer coated onto the polyester surface of a container preform or as a outer layer of a container preform and the preform then blown to form a container. In the latter instance, the resulting container will have a barrier layer of a polyvinylidene chloride film.

The concept of having a polyester preform coated with a vinylidene chloride or other polymeric coating, and then blowmolding this preform to a container is shown in U.S. Pat. No. 4,254,170; U.S. Pat. No. 4,267,143; U.S. Pat. No. 4,267,743; U.S. Pat. No. 4,714,5830 and U.S. Pat. No. 4,615,925. Coating the preform is preferred when the container is to be produced on a high speed blowmolding line. It removes a relatively slow subsequent coating step. U.S. Pat. No. 4,478,889 discloses that the polyvinylidene chloride layer should be highly crystallized in order to improve the adhesion of the coating to the polyester surface. U.S. Pat. No. 4,505,951 discloses to cure polyvinylidene chloride water based emulsion coatings with infrared energy to prevent the entrapment of water in the coating. And U.S. Pat. No. 4,515,836 discloses the coating of polyvinylidene chloride emulsions onto a container by using airless spray nozzles. This forms coatings with good gas barrier properties. None of these patents are directed to producing a container that has good moisture barrier properties. The concern is a gas barrier for beverage bottles. None of the references discloses how to put an effective moisture barrier onto a tube container.

The moisture barrier properties of a polyester tube can be increased by means of a coating, such as a polyvinylidene chloride latex or solvent coating, on the exterior surface of the tube package. The polyvinylidene chloride coating can be on the entire surface of the tube package, i.e. both on the tube body and the tube shoulder or only on the tube body which is the sidewall of the tube. The outer layer decoration material also can have moisture barrier properties. One technique is to first put a decoration on at least part of the exterior surface of the tube package, cause the material of the decoration to bind to the polyethylene terephthalate surface the tube package, and then to coat the entire surface with the polyvinylidene chloride composition. However, this has several disadvantages. One is a gradual discoloration of the polyvinylidene chloride outer layer. The preferred technique is to coat substantially all of the tube package with the polyvinylidene chloride coating and then to apply the tube decoration onto this coating as the outer layer. A primary requirement then is that the decoration form a good bond to the polyvinylidene chloride coating and that the polyvinylidene chloride coating form a good bond to the polyester tube wall.

It has been found that when the transmission of the moisture is from within a polyester container to the exterior that a polyvinylidene chloride coating cannot be applied directly to the surface of the tube to effectively prevent moisture transmission. Upon the moisture from within the tube contacting the polyvinylidene coating, the coating peels away from and flakes off the polyester surface of the tube. This is not the case where moisture is from the exterior and first contacts the polyvinylidene chloride layer and then the polyester wall of the container. This problem is solved using the inventions disclosed herein.

This problem is more severe for tube containers, and in particular, collapsible tube containers. In dispensing products from tube containers, the sidewalls are flexed whether the tube walls remain in the dispensed shape or return to their original shape. The flexing of the sidewalls increases the cracking and peeling of a polyvinylidene chloride coating on a tube which contains an aqueous composition.

Another problem is that polyvinylidene chloride coatings upon exposure to ultraviolet and visible radiation tend to form a yellow tint. The yellow tint increases with time. The addition of a blue tint to remove the yellow tint is not effective for tubes and other containers that are white since the degree of yellow tint increases with time. This problem likewise is solved using the inventions disclosed herein.

BRIEF SUMMARY OF THE INVENTION

The present invention is directed to polyester tube containers, such as polyethylene terephthalate tube containers, with good moisture barrier properties. For the purposes of this application a tube container is an elongated container with flexible sidewalls and a circular to elliptical shape that is squeezed to dispense the contained product. The nondispensing end of the container can be integral with the tube walls or it can have an open end that is crimp sealed closed. The containers preferably are coated with a polyvinylidene chloride coating and then with a decoration coating. The polyvinylidene chloride coating has good moisture barrier properties. The polyester tube material has good organic barrier properties. The end product has both good moisture barrier and organic barrier properties.

However, a polyvinylidene coating cannot be put directly onto a polyester tube surface when the tube is to contain an aqueous composition. The moisture that traverses through the polyester tube wall will cause the coating to peel and flake from the wall surface. It was found that a primer that would bind both to the polyester material of the tube wall and to the overlaying polyvinylidene chloride coating must be used. Such a primer coating is not needed when the moisture is to traverse from the exterior to the interior of the tube container. The polyvinylidene chloride coating is applied directly to the cured primer coating.

In one embodiment the polyvinylidene chloride coating then is overlayed with an opaque decorative coating. Such an opaque coating is needed when the surface of the tube is white or another color which would be visually affected by a yellowing of the polyvinylidene chloride underlayer. An opaque decorative overlayer over the polyvinylidene chloride layer prevents and masks any yellowing of the polyvinylidene chloride layer. This will provide for a clean appearance to the tube.

In a further embodiment the tube container can be of a transparent or semitransparent material that is a color that will mask the yellow tint of the polyvinylidene chloride layer. In such an instance no opaque layer is required over the polyvinylidene chloride layer to mask the yellow tint of the polyvinylidene chloride layer.

In a yet further embodiment the tube container can be of an untinted transparent or semitransparent material. However, the product is of a color which will negate the yellow tint of the polyvinylidene layer. In such an instance no opaque layer also is over the polyvinylidene chloride layer to mask the yellow tint of the polyvinylidene chloride layer.

Each of the embodiments solves the problem of securing the polyvinylidene chloride layer to the polyester surface of the tube and the problem of the gradual yellowing of the polyvinylidene chloride layer with aging. The embodiment of using an opaque decorative outer layer is preferred for white tubes. This decorative outer layer will mask any color change in the polyvinylidene chloride underlayer.

The coatings can be applied by any of the known techniques such as spraying, dipping or roller coating. A preferred coating technique is roller coating using a foam surfaced roller. Such a roller will coat small imperfections in the surface of the tube. Each coating is cured to dryness prior to a subsequent coating being applied. Curing consists of heating the tube to about 30° C. to about 55° C. The curing of the polyvinylidene chloride coating also serves to increase the crystallinity of this coating. An increase in crystallinity increases the moisture barrier properties.

However, regardless of the coating technique that is used, it is important that the polyvinylidene chloride coating be firmly bonded to the polyester surface. This is enhanced by the use of a primer coating directly onto the polyester surface followed by the decoration coating or polyvinylidene chloride coating. It is preferred that the polyvinylidene chloride coating overlay the primer coating and the decoration coating overlay the polyvinylidene chloride coating. Such a primer coat has good bonding properties to the polyester surface and to the polyvinylidene chloride layer. A primer coat has been found to be necessary to assure that the polyvinylidene chloride coating remains adhered to the polyester surface upon the product moisture reaching the polyvinylidene chloride layer from the interior of the tube container.

The moisture barrier properties of a polyester tube are significantly improved by the foregoing coatings. The moisture vapor transmission of an uncoated tube is about 4 to 5 gm/m$^2$/day and for a coated tube less than about 1 gm/m$^2$/day. Further, there is no flaking or peeling of the coating from the polyester surface under accelerated aging after 30 days at a temperature of 49° C.

DETAILED DESCRIPTION OF THE DRAWINGS

DETAILED DESCRIPTION OF THE INVENTION

The present invention is directed to a polyester tube for packaging water-containing compositions such as dentifrices, lotions, gels, creams and similar compositions. In a preferred mode it is directed to injection stretch blow-molded polyester tube containers. Such containers have a high strength and good barrier properties with regard to organics such as flavors and fragrances. However, polyester tubes have a high transmissivity of moisture. That is the polyester wall of the tube has low moisture barrier properties.

In order to increase the moisture barrier properties of polyesters it is known to coat the surface of a polyester package with polyvinylidene chloride. However, when a polyester tube package contains an aqueous composition, the polyvinylidene chloride coating peels and flakes from the surface of the tube. This peeling and flaking increases when the tube surface is flexed during dispensing. This does not occur when the moisture transmission is from the outside to the inside of such a tube container.

Figure 1:
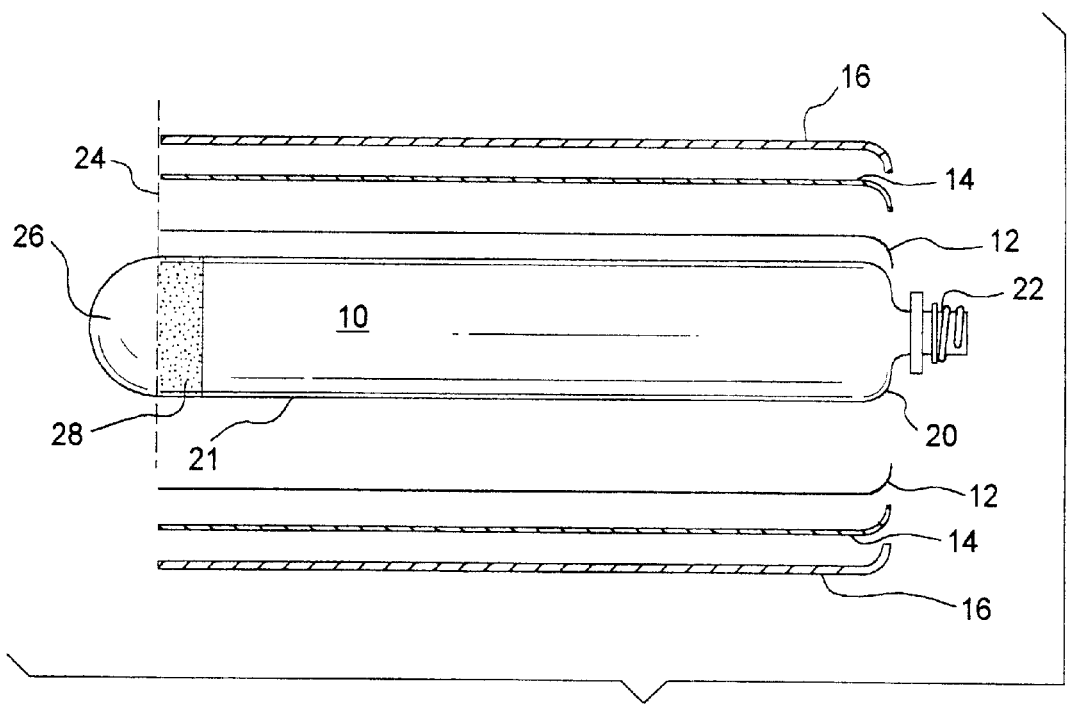
FIG. 1 is a view of a polyester tube illustrating the different coatings.
Figure 2:
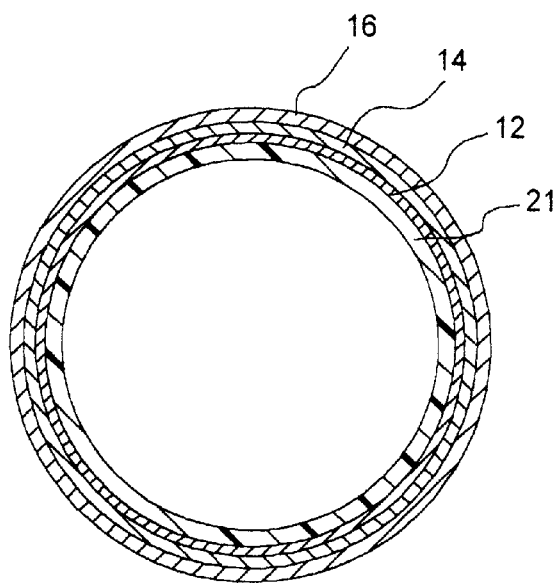
FIG. 2 is a cross-section of the tube of FIG. 1.

FIGS. 1 and 2 illustrate the solution to the problem of providing a polyester tube with good moisture barrier properties. FIG. 1 schematically shows various coatings on a polyester tube These are shown in a cross-sectional view in FIG. 2. The tube 10 is an injection stretch blowmolded tube. The tube has a tube body 27, shoulder 20 and a nozzle 22. The other end 26 of the tube can be severed at 24 for filling and then crimp sealed such as at 28. If not severed, the tube will be top filled through the dispensing nozzle. 22.

The first coating 12 that is applied to the polyester surface is a primer coat. This is a coating that will bond to the polyester surface of the tube and to the polyvinylidene chloride layer that is applied to the primer layer. The primer layer can be a coating that will bond to polyester and to polyvinylidene chloride such as styrene-butadiene, polyester/isocyanate, polyester/acrylic polymer, or other acrylic acid emulsions or solutions. This coating can be applied by any known technique such as spray coating, dipping and roller coating. Roller coating is preferred, and in particular, roller coating with a resilient surfaced roller that conforms to the tube surface.

Prior to the primer coating, the polyester surface can be treated with a corona discharge, flame treatment, chemical treatment or other technique to increase the surface energy of the polyester surface. This activates the polyester surface and increases the adherence of the primer to the polyester surface.

The primer coating is cured by being heated to about 30° C. to about 55° C. for about 0.1 second to about 600 seconds. After the primer has been cured the tube is coated with polyvinylidene chloride. This can be applied as an organic solution or an aqueous emulsion.

The polyvinylidene chloride layer 14 is applied to the cured primer by any of the techniques used for the primer coat. The preferred technique is roller coating having a flexible roller. After coating, the polyvinylidene chloride is cured by heating to about 30° C. to about 55° C. for about 0.1 seconds to about 600 seconds and preferably about 1 to 30 seconds. The heating to cure the coating also serves to increase the rate of crystallinity of the polyvinylidene chloride coating. Such an increase in crystallinity increases the moisture barrier properties. The crystallinity of the coating will continue after the heating and when the tube is at about room temperature.

A final layer in one embodiment is an opaque decorative layer 16. The layer 16 will mask or prevent yellowing of the polyvinylidene chloride layer. The polyvinylidene chloride layer is susceptible to yellowing when exposed to ultraviolet and visible radiation. This yellowing is a problem with white or light colored tubes. Over time while on a store shelf, the tubes will discolor. However, this will not occur or be perceived to have occurred by having an opaque coating over the polyvinylidene chloride layer. This opaque layer also will be the decoration layer and will be applied by a printing technique. The decoration layer will contain the product name, trademarks, colors and various print information. This layer can be ultraviolet radiation curable.

The outer decoration layer 16 can be omitted in some instances. The function of the outer layer is to be a mask for the polyvinylidene chloride layer. The decoration layer prevents UV and visible light from contacting the polyvinylidene chloride layer and causing this layer to develop a yellow tint. Also, any yellow tint that is developed is hidden by the outer layer 16. If the tube is to be a transparent tube, there will not be an outer layer 16. In such a case the product in the tube will be of a color to neutralize any yellow tint of the polyvinylidene chloride layer. That is, it will be of a color that when added to the yellow tint, yields substantially no color. In most cases the product will be a blue tint. The blue tint of the product will neutralize the yellow tint of the polyvinylidene chloride layer and yield a substantially clear, noncolored tube.

The use of an outer layer also can be omitted if the tube is of a color such that when the polyvinylidene chloride layer develops a yellow tint that the color of the tube, additively with the yellow tint of the polyvinylidene chloride, will yield substantially no color. In such an instance the tube body should be of a blue tint. The blue tint of the tube body and the yellow tint of the polyvinylidene chloride layer will yield a substantially clear, noncolored tube.

As an option an ultraviolet stabilizer can be added to the polyvinylidene chloride emulsion. Such stabilizers absorb ultraviolet energy and dissipate it as heat. Such ultraviolet energy absorbers will decrease the yellowing of the polyvinylidene chloride coating. Suitable ultraviolet stabilizers are Tinuvin 326 and Tinuvin 213 from Ciba Geigy. These are 2-(5-chloro-2H-benzotriazol=2yl)-6-(1,1-dimethylethyl)-4-methylphenol and methyl 3-(3-2H-benzotriazol-2-yl)-5-t-butyl-4hydroxyphenyl) propionate, respectively. These would be added in an amount of about 0.5% to 3% of the polyvinylidene chloride content. The moisture transmissivity of the polyester tubes, coated and uncoated, is given in Table 1. It is seen that the tubes with the primer and polyvinylidene chloride coating provide the better moisture barrier after aging for 7 days at 38° C.

TABLE 1

| PET TUBE | MOISTURE TRANSMISSION IN g/m 2.day (38 C, 80% R.H.) | |
|---|---|---|
| Body Coat g/m2 | Daran 8730 | Ixan PA 232 |
| 0.0 | 4.3 | 4.3 |
| 9.0 | | |
| 9.7 | 1.2 | |
| 9.9 | 1.2 | |
| 10.0 | | |
| 14.0 | | |
| 14.7 | | 0.8 |
| 15.1 | 0.9 | |
| 16.4 | 0.8 | |
| 16.7 | 0.8 | |
| 19.6 | | 0.7 |
| 20.0 | | |
| 21.3 | 0.7 | |
| 22.1 | 0.7 | |
| 24.5 | 0.7 | |
| 26.9 | 0.7 | |
| 28.2 | 0.6 | |
| 30.0 | | |
| 30.8 | | 0.5 |
| 33.9 | 0.6 | |
| 35.7 | 0.5 | |
| 36.7 | 0.6 | |

DARAN 8730 is an aqueous dispersion of polyvinylidene chlorate available from Hamsphire Chemical Corporation, a subsidiary of the Dow Chemical Company, Midland, Mich.

IXAN PA 232 is an aqueous dispersion of a polyvinylidene chloride copolymer available from Solvay America, Inc., Houston, Tex.

The tube is a biaxially oriented polyethylene terephthalate tube having a wall thickness of 130 microns. It is seen that at a coating level of about 18 g/m² to 25 g/m² that an optimum level of polyvinylidene chloride coating is achieved. Additional amounts of polyvinylidene chloride will not significantly decrease the moisture transmission and will increase the drying time and tend to add to the yellowing affect In Table 2 there is provided a comparison of the integrity of tubes where there is a primer coating and where no primer coating is used. It is seen that a primer coating is required between the polyester surface and the polyvinylidene chloride layer to prevent peeling and flaking.

TABLE 2

| 48.9° C. AGING | CORONA TREATMENT | PRIMER WEIGHT ²(G/M2) | WA 50 COAT WEIGHT (G/M2) | CRUSH TEST 4 WEEKS RATING |
|---|---|---|---|---|
| Control | Yes | 0 | 0 | 6–8 |
| J-13 | No | 2.7 | 22 | 2 |
| J-14 | No | 3.0 | 22 | 2 |
| J-05 | No | 5.0 | 21 | 3 |
| J-09 | No | 5.5 | 29 | 3 |
| J-10 | No | 5.7 | 26 | 2 |
| J-34 | Yes | 6.1 | 15 | 2 |
| J-33 | Yes | 6.5 | 30 | 2 |
| 48.9° C. Aging | Corona Treatment | Primer Weight ¹(g/m2) | WA 50 Weight (mg) | Crush Test Rating |
| Control | Yes | 0 | 0 | 6–8 |
| A1 | No | 2.7 | 17.8 | 2 |
| A2 | No | 2.3 | 17.9 | 2 |
| A3 | No | 1.9 | 17.8 | 2 |
| A4 | No | 1.2 | 18.9 | 2 |

TABLE 2-continued

| | | | | |
|---|---|---|---|---|
| B1 | Yes | 2.1 | 16.8 | 2 |
| B2 | Yes | 3.0 | 18.2 | 2 |
| B3 | Yes | 2.2 | 16.7 | 2 |
| B4 | Yes | 1.8 | 17.2 | 2 |
| C9 | Yes | 1.2 | 16.5 | 2 |
| C9 | Yes | 1.2 | 16.4 | 2 |
| C10 | Yes | 1.3 | 16.1 | 2 |
| C11 | Yes | 1.5 | 16.5 | 2 |

[1] DOW 620NA styrene-butadiene copolymer water base primer
[2] SOLVAY WA50 Polyvinylidene Chloride Emulsion available from Solvay America, Inc.

Morton Adcote 503E+co-reactant F. primer is an aqueous dispersion of polyvinylidene chloride available form the Morton International Division of Rohm & Haas, Philadelphia, Pa.

In Table 2 it is seen that the use of a primer coat on the polyester tube surface bonds the polyvinylidene chloride layer to the polyester surface. This is seen in the crush test data. The crush test ratings are given in a range of 0 to 10, with a rating of 0 to 3 being fully acceptable. The apparatus for conducting the crush test consists of a base which has a series of holes to accommodate tubes of a diameter of 1.8 cm to 3.0 cm. The tube is inserted nozzle and shoulder into the base. A mandrel then is inserted into the open tube bottom and into the base. A crushing handle then is inserted around the mandrel. The crushing handle has an aperture to accommodate the mandrel. In one continuous motion the tube is pushed downward and is compressed around the mandrel between the handle and the base. The crushed tube then is removed and stretched to near it original length. A visual rating is given according to the following scale:

1. Perfect Performance: no sign of cracking or peeling; coating hard, tough and elastic and shows good adhesion.
2. Excellent Performance: a few isolated, very fine hairline cracks.
3. Good Performance: very fine hairline cracks; tube body visible at some of the cracks but coating has good adhesion.
4. Fairly Good Performance: small but distinct cracks; tube body shows at cracks but coating maintains good adhesion.
5. Fair Performance: cracks noticeable; tube body shows at cracks; coating peels slightly at cracks but maintains fairly good adhesion.
6. Fair Performance: cracks considerable and separates from tube body at some points of cracking.
7. Poor Performance: cracks considerable and peels consistently at point of cracking.
8. Poor Performance: cracks, peels and flakes.
9. Poor Performance: cracks, peels and flakes extensively.
10. Very Poor Performance: coating flakes off without crushing or bending.

All of the tubes that had a primer coating have acceptable crush test results. The coating had minimal cracking and peeling. there was good adherence of the coating to the polyester surface of the tube. The tubes that had no primer coat had test values of 6 to 8.

The above description sets out the preferred embodiments of the invention. The following claims particularly point out and distinctly claim what the inventors consider to be their invention.

What is claimed is:

1. A method for preparing a polyester tube for packaging an aqueous composition comprising:
   a) providing a tube package having a polyester tube body with a shoulder and nozzle at one end;
   b) applying a primer material as a coating to at least said tube body, said primer material adhering to a polyester surface of said tube body and capable of adhering to a coating material containing polyvinylidene chloride;
   c) heating said primer material to cure said primer material onto said tube body whereby said primer material does not peel away from and flake off of the polyester surface of said tube body when a water containing composition is contained in said tube package and thereby cause a coating containing polyvinylidene chloride to peel away from and flake off said tube body;
   (d) applying a coating of a material containing polyvinylidene chloride onto the cured primer material to provide a moisture barrier for at least the tube body whereby water transmission from said aqueous composition through said tube body is limited;
   (e) heating said polyvinylidene chloride-containing material to cure said polyvinylidene chloride-containing material and to adhere said polyvinylidene chloride containing material to said primer material; and
   (f) applying to the cured polyvinylidene chloride a mask layer of a material to prevent UV and visible light from contacting the cured polyvinylidene chloride-containing material.

2. A method as in claim 1 wherein said polyester tube is a biaxially oriented polyethylene terephthalate tube.

3. A method as in claim 2 wherein said polyester tube has a wall thickness of less than about 200 microns.

4. A method as in claim 1 wherein said polyvinylidene chloride containing material is roller coated onto said cured primer material.

5. A method as in claim 1 wherein said polyvinylidene chloride containing material is spray coated onto said cured primer material.

6. A method as in claim 1 wherein said tube body is substantially white in color and said mask layer is an opaque decorative coating which overlays at least the surface of said tube having a coating of polyvinylidene chloride-containing material.

7. A method as in claim 5 wherein the polyester comprising said tube body is white in color.

8. A method as in claim 1 where said primer material is a product of a reaction mixture of at least one polyester component and at least one isocyanate reactant.

9. A method as in claim 1 where said polyvinylidene chloride-containing material is an aqueous dispersion comprised of polyvinylidene chloride.

10. A method as in claim 1 where said polyvinylidene chloride-containing material is an organic solution comprised of said polyvinylidene chloride.

11. A method as in claim 1 wherein after coating with said polyvinylidene chloride-containing material said tube package is heated to about 30° C. to 55° C. for about 0.1 to 600 seconds whereby the crystallinity of the coating of said second material is increased.

12. A method as in claim 1 wherein a rate of moisture vapor transmission of the tube package coated with said polyvinylidene chloride-containing material is less than about 1 gram/m$^2$/day.

13. A method as in claim 1 wherein said primer material coating has a cured nominal thickness of about 0.5 micron to about 5 micron and said second coating has a cured nominal thickness of about 3 micron to about 30 micron.

14. A method as in claim 1 wherein prior to being coated with said primer material, the surface of said tube package undergoes a corona treatment.

15. A method as in claim 1 wherein said primer material is heated to about 30° C. to 55° C. for about 0.1 to 600 seconds to cure said primer material on said polyester surface.

16. A method as in claim 1 wherein said primer material is one of a solution or emulsion comprised of styrene-butadiene, polyester/isocyanate, or polyester/acrylic polymer.

17. A method as in claim 1 wherein said mask layer to prevent UV and visible light from contacting the cured polyvinylidene chloride is an opaque material.

18. A method as in claim 1 wherein said mask layer is a decoration layer.

19. A method for preparing a polyester tube for packaging an aqueous composition comprising:

a) providing a tube package having a polyester tube body with a shoulder and nozzle at one end, at least said body having a tint of a first color;

b) applying a primer material as a coating to at least said tube body, said primer material adhering to a polyester surface of said tube package and capable of adhering to a coating material containing polyvinylidene chloride;

c) heating said primer material to cure said primer material onto said tube body whereby said primer material does not peel away from and flake off of the polyester surface of said tube body when a water containing composition is contained in said tube package and thereby cause a coating comprising polyvinylidene chloride to peel away from and flake off said tube body;

(d) applying a coating of a material containing polyvinylidene chloride onto the cured primer material to provide a moisture barrier for at least tube body whereby said polyvinylidene chloride-containing material develops a tint of a second color, said first color being such that when said polyvinylidene chloride-containing material develops a tint of such second color, said first color and said second color mix to cancel said second color and yield no color; and (e) heating said polyvinylidene chloride-containing material to cure said polyvinylidene chloride-containing material and to adhere said polyvinylidene chloride containing material to said primer material.

20. A method as in claim 19 wherein said primer material is heated to about 30° C. to 55° C. for about 0.1 to 600 seconds to cure said primer material on said polyester surface.

21. A method as in claim 19 wherein said primer material is one of a solution or emulsion comprised of styrene-butadiene, polyester/isocyanate, or polyester/acrylic polymer.

22. A method as in claim 19 wherein said packaging tube is a biaxially oriented polyethylene terephthalate tube.

23. A method as in claim 19 wherein a rate of moisture vapor transmission of said tube package is less than about 1 gram/m$^2$/day.

24. A method as in claim 19 wherein said primer material coating has a cured nominal thickness of about 0.5 micron to about 5 micron and said coating with a polyvinylidene chloride-containing material has a cured nominal thickness of about 3 micron to about 30 micron.

25. A method as in claim 19 wherein prior to being coated with said primer material, the surface of said tube package undergoes a corona treatment.

* * * * *